United States Patent
Song et al.

(10) Patent No.: US 10,108,584 B2
(45) Date of Patent: Oct. 23, 2018

(54) HOST APPARATUS AND SCREEN CAPTURE CONTROL METHOD THEREOF

(75) Inventors: Mi Sook Song, Suwon-si (KR); Dong Chae Park, Suwon-si (KR); Hyung Jong Kang, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 1068 days.

(21) Appl. No.: 13/137,794

(22) Filed: Sep. 13, 2011

(65) Prior Publication Data

US 2012/0072833 A1 Mar. 22, 2012

(30) Foreign Application Priority Data

Sep. 17, 2010 (KR) .................. 10-2010-0091516

(51) Int. Cl.
| | |
|---|---|
| *G06F 17/00* | (2006.01) |
| *G06F 17/21* | (2006.01) |
| *G06F 9/54* | (2006.01) |
| *G06F 3/0484* | (2013.01) |
| *G06F 3/12* | (2006.01) |

(52) U.S. Cl.
CPC .......... *G06F 17/212* (2013.01); *G06F 3/0484* (2013.01); *G06F 3/1256* (2013.01); *G06F 9/543* (2013.01); *G06F 3/1206* (2013.01); *G06F 3/1247* (2013.01); *G06F 3/1284* (2013.01); *G06F 2216/17* (2013.01)

(58) Field of Classification Search
CPC ...... G06F 17/212; G06F 3/0484; G06F 9/543; G06F 2216/17; G06F 3/1256
USPC ........ 715/210, 243, 253, 273, 769, 770, 804
See application file for complete search history.

(56) References Cited

U.S. PATENT DOCUMENTS

| | | | | |
|---|---|---|---|---|
| 5,991,846 A | * | 11/1999 | Ooki | G06F 3/1205 710/113 |
| 6,680,843 B2 | * | 1/2004 | Farrow et al. | 361/679.02 |
| 7,065,712 B2 | * | 6/2006 | Muto | G06Q 30/02 715/760 |
| 7,509,577 B2 | * | 3/2009 | Kuwata | G06F 9/543 709/203 |
| 7,516,398 B2 | * | 4/2009 | Yang | G06F 17/24 709/205 |

(Continued)

FOREIGN PATENT DOCUMENTS

| | | |
|---|---|---|
| EP | 1 313 007 A1 | 5/2003 |
| EP | 2 202 630 A2 | 6/2010 |
| KR | 10-2010-0074568 | 7/2010 |

OTHER PUBLICATIONS

Microsoft, "Microsoft Office 2010 Now Available for Consumers Worldwide", Microsoft News Center, Jun. 15, 2010, 4 pages http://www.microsoft.com/en-us/news/press/2010/jun10/06-152010OfficeLaunchPR.aspx.*

(Continued)

*Primary Examiner* — Cesar Paula
*Assistant Examiner* — David Faber
(74) *Attorney, Agent, or Firm* — Staas & Halsely LLP

(57) ABSTRACT

A host apparatus which controls screen capture using a web capture application or a capture application, and a screen capture control method thereof. The host apparatus shares capture areas or saved files using a web capture application through which a screen of a web browser is captured and is compatibly saved or using a capture application through which a desktop screen is captured and is compatibly saved.

19 Claims, 11 Drawing Sheets

(56) References Cited

U.S. PATENT DOCUMENTS

| | | | | |
|---|---|---|---|---|
| 7,870,493 | B2* | 1/2011 | Pall | G06F 9/543 715/751 |
| 8,503,012 | B2* | 8/2013 | Lee | G06F 3/1208 358/1.15 |
| 8,839,119 | B2* | 9/2014 | Pall | G06F 9/543 715/751 |
| 2003/0161641 | A1* | 8/2003 | Edmonds | G06F 3/121 399/23 |
| 2003/0169296 | A1* | 9/2003 | Ito | G06F 3/1205 715/770 |
| 2003/0182388 | A1* | 9/2003 | Alexander | G06F 9/543 709/213 |
| 2004/0039995 | A1* | 2/2004 | Kuwata | G06F 9/543 715/255 |
| 2005/0091186 | A1* | 4/2005 | Elish | G06F 17/30873 |
| 2005/0102629 | A1 | 5/2005 | Chen et al. | |
| 2006/0036958 | A1* | 2/2006 | Dreher | G06F 9/543 715/764 |
| 2006/0075353 | A1* | 4/2006 | DeSpain | G06F 17/24 715/770 |
| 2006/0112332 | A1* | 5/2006 | Kemp et al. | 715/530 |
| 2007/0079249 | A1* | 4/2007 | Pall | G06F 9/543 715/758 |
| 2008/0294981 | A1* | 11/2008 | Balzano | G06F 17/21 715/256 |
| 2009/0144368 | A1* | 6/2009 | Andersen | G06F 9/543 709/205 |
| 2010/0157366 | A1* | 6/2010 | Lee | G06F 3/1208 358/1.15 |
| 2010/0245892 | A1* | 9/2010 | Takahashi | G06F 3/1204 358/1.15 |
| 2011/0072365 | A1* | 3/2011 | Pall | G06F 9/543 715/753 |

OTHER PUBLICATIONS

Habraken, Joe, "Microsoft Office XP 8-in 1: What Is Object Linking and Embedding (OLE)?", Que, Jun. 5, 2001, 7 pages.*
Microsoft, "Use Snipping Tool to capture screen shots", Microsoft, Oct. 11, 2009, 2 pages http://web.archive.org/web/20091011105942/http://windows.microsoft.com/en-us/windows7/Use-Snipping-Tool-to-capture-screen-shots.*
Microsoft, "Microsoft Snipping Tool", Microsoft, 2009, SS1-7 + 4 pages (11 total pages).*
D. Rich, "How to Use SnagIt", 2009, 6 pages.*
Techsmith, "Snagit—Help Document", pub. May 2010, 194 pages.*
Techsmith, " Snagit Add-Ins User Guide", online as of Nov. 3, 2008, 34 pages + 1 WayBack Machine page disclosing the date (35 Pages total).*
Samsung ("See it, print it. Quick web printing—at the touch of a button", pub. Jul. 2009, 2 pages.*
Screenshots of Microsoft Internet Explorer and Microsoft Word/Microsoft Office using SnagIt Add-Ins, Snagit + Add-Ins released Aug. 29, 2008, SS1-21 (21 pages total).*
Samsung, "Samsung AnyWeb Print", copyrighted 2008, FIG. 0a-20 + pp. 1-13 (36 pages total)).*
European Summons to attend Oral Hearing in corresponding European Patent Application No. 11181199.8.
Japanese Office Action dated Nov. 10, 2015 from Japanese Patent application No. 2011-203770, 5 pages.
EPO Communication under Rule 71(3) dated Nov. 12, 2015 from European Patent Application No. 11181199.8, 58 pages.
AnyWeb Print Application, [online], Samsung, May 20, 2009, pp. 1 to 14, [searched on Oct. 27, 2015], Internet, URL, http://www.samsung.com/ph/business-images/resource/white-paper/2012/11/PS4_ITS_1212_Printer_Anyweb_Print_solution_WP-0.pdf, (14 pages total).
Software Review media navigator captured memo, PC fan, Japan, Mainichi Communications Co., Sep. 1, 2010, vol. 17, No. 9, p. 167 (3 pages total).
Haru's introduction for hackers Part 2 enhancing Windows by online-soft, PC Japan, Japan, Softbank Publishing Co., Apr. 1, 2001, vol. 6, No. 4, pp. 70 to 83 (16 pages total).
AnyWeb Print Application, internet materials, Samsung, May 20, 2009, pp. 1 to 14.
Korean Office Action dated Jul. 8, 2016 from Korean Patent Application No. 10-2010-0091516, 12 pages.
Korean Office Action dated Apr. 26, 2017 from Korean Patent Application No. 10-2010-0091516, 7 pages.
Korean Office Action dated Feb. 15, 2017 from Korean Patent Application No. 10-2010-0091516, 4 pages.

* cited by examiner

HOST APPARATUS AND SCREEN CAPTURE CONTROL METHOD THEREOF

CROSS-REFERENCE TO RELATED APPLICATIONS

This application claims the benefit of Korean Patent Application No. 10-2010-0091516, filed on Sep. 17, 2010 in the Korean Intellectual Property Office, the disclosure of which is incorporated herein by reference.

BACKGROUND

1. Field

Embodiments of the present disclosure relate to a host apparatus and a screen capture control method thereof.

2. Description of the Related Art

An image forming device may include a variety of devices which generate image data, such as a copier, a printer, a fax machine, a scanner, and a Multifunction Peripheral (MFP). The MFP may carry out a plurality of functions among copying, printing, scanning, fax transmission, email transmission, and file transmission.

To control the image forming device or to perform at least one of the functions supported by the image forming device, a device driver or an application may be installed in a computer which is connected to the image forming device through a wired/wireless network or a Universal Serial Bus (USB) interface.

An application refers to software necessary to use an image forming device, or a computer which is connectable to the image forming device and has a variety of types according to a manufacturer of the image forming device or a use purpose of the image forming device.

A capture application which is capable of capturing a necessary area from a desktop screen displayed on a monitor or a web capture application which is capable of capturing a necessary area from a web page of a web browser displayed on a monitor may be installed in a computer which is connectable to an image forming device.

A captured area captured through the capture application or web capture application may be edited through a separate editing application.

The captured area may be stored as an image file or may be printed through an image forming device.

SUMMARY

In accordance with one aspect of the present disclosure, a host apparatus which is connectable to an image forming device and to a display includes a controller configured to control operations of a web capture application and a capture application, and a storage, wherein the controller controls the web capture application driven on a display to capture a first capture area displayed on a screen of a web browser, add the first capture area to a first shared clipboard displayed at one side of the screen, and save the first capture area in the storage as a first file which is compatible in the capture application, and controls the capture application driven on the display to capture a second capture area displayed on a desktop screen, add the second capture area to a second shared clipboard displayed at one side of the desktop screen, and save the second capture area in the storage as a second file which is compatible in the web capture application, and wherein the first and second shared clipboards correspond to the size of a recording medium supported by the image forming device and at least one of the compatible first and second files is openable and editable in the first and second shared clipboards.

The host apparatus may further include a communication interface which is connectable to the image forming device and the controller may control at least one of the first file and the second file to be transmitted to the image forming device through the communication interface.

The display may be an all-in-one type with the host apparatus.

In accordance with another aspect of the present disclosure, a screen capture control method of a host apparatus which is connectable to an image forming device includes driving a web capture application which is displayed on a display and includes a screen of a web browser and a first shared clipboard displayed at one side of the screen of the web browser, capturing a first area from the screen of the web browser and adding the first capture area to the first shared clipboard to save the first capture area as a first file which is compatible in a capture application, driving a capture application which is displayed on the display and includes a desktop screen and a second shared clipboard displayed at one side of the desktop screen, opening and displaying the first file on the second shared clipboard of the capture application, and capturing a second area displayed on the desktop screen and adding the second capture area to the second shared clipboard on which the first file is displayed to save the second capture area as a second file which is compatible in the web capture application, wherein the first and second shared clipboards correspond to the size of a recording medium supported by the image forming device and at least one of the compatible first and second files is openable and editable in the first and second shared clipboards.

The open and display of the first file on the second shared clipboard may include selectively opening file names or thumbnail images corresponding to at least one of the first file, an image file, and a text file which are previously stored.

The screen capture control method may further include adding an Object Linking and Embedding (OLE) entity selected from another application driven on the display to the first shared clipboard.

The screen capture control method may further include adding an Object Linking and Embedding (OLE) entity selected from another application driven on the display to the second shared clipboard.

The screen capture control method may further include changeably displaying a size of the web browser to a size of the first shared clipboard or changeably displaying a size of the desktop screen to a size of the second shared clipboard.

The web capture application may capture the first capture area as a file having an extension of EMF and extract and save text included in the first capture area.

The screen capture control method may further include performing tasks corresponding to the first or second capture area using the image forming device.

If there is a plurality of displays, the web capture application and the capture application may be driven on respective displays.

The second capture area may be openable in the first shared clipboard and the first capture area may be openable in the second shared clipboard.

The display may be an all-in-one type with the host apparatus.

In accordance with still another aspect of the present disclosure, a screen capture control method of a host apparatus which is connectable to an image forming device includes driving a web capture application out of the web capture application and a capture application which are displayed on a display, wherein using the web capture application, a first capture area is captured from a screen of a web browser and added to a first shared clipboard displayed at one side of the screen of the web browser, and wherein using the capture application, a second capture area is captured from a desktop screen and added to a second shared clipboard displayed at one side of the desktop screen, opening and displaying at least one previously saved file on the first shared clipboard corresponding to a size of a recording medium of the image forming device, capturing the first capture area displayed on the screen of the web browser using the web capture application, and adding the first capture area to the first shared clipboard on which the at least one file is displayed.

The screen capture control method may further include saving the at least one file displayed on the first shared clipboard or captured data as a first file which is compatible in the capture application, and the first file may be editable in the web capture application or in the capture application.

The web capture application may be an application plugged into the web browser.

The screen capture control method may further include adding an Object Linking and Embedding (OLE) entity selected from other applications driven from the desktop screen to the first shared clipboard.

The display may be an all-in-one type with the host apparatus.

In accordance with a further aspect of the present disclosure, a screen capture control method of a host apparatus which is connectable to an image forming device include driving an integrated capture application including a web capture application and a capture application, wherein using the web capture application, a first capture area is captured from a screen of a web browser and added to a first shared clipboard displayed at one side of the screen of the web browser, and wherein using the capture application, a second capture area is captured from a desktop screen and added to a second shared clipboard displayed at one side of the desktop screen, acquiring activation information representing whether the web browser is activated in response to driving of the integrated capture application, and if the web browser is activated, driving the web capture application, and if the web browser is not activated, driving the capture application, wherein the web capture application saves the first capture area as a first file which is compatible in the capture application and the capture application saves the second capture area as a second file which is compatible in the web capture application.

The first and second shared clipboards may correspond to the size of a recording medium supported by the image forming device and at least one of the compatible first and second files may be openable and editable in the first and second shared clipboards.

Additional aspects and/or advantages will be set forth in part in the description which follows and, in part, will be apparent from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
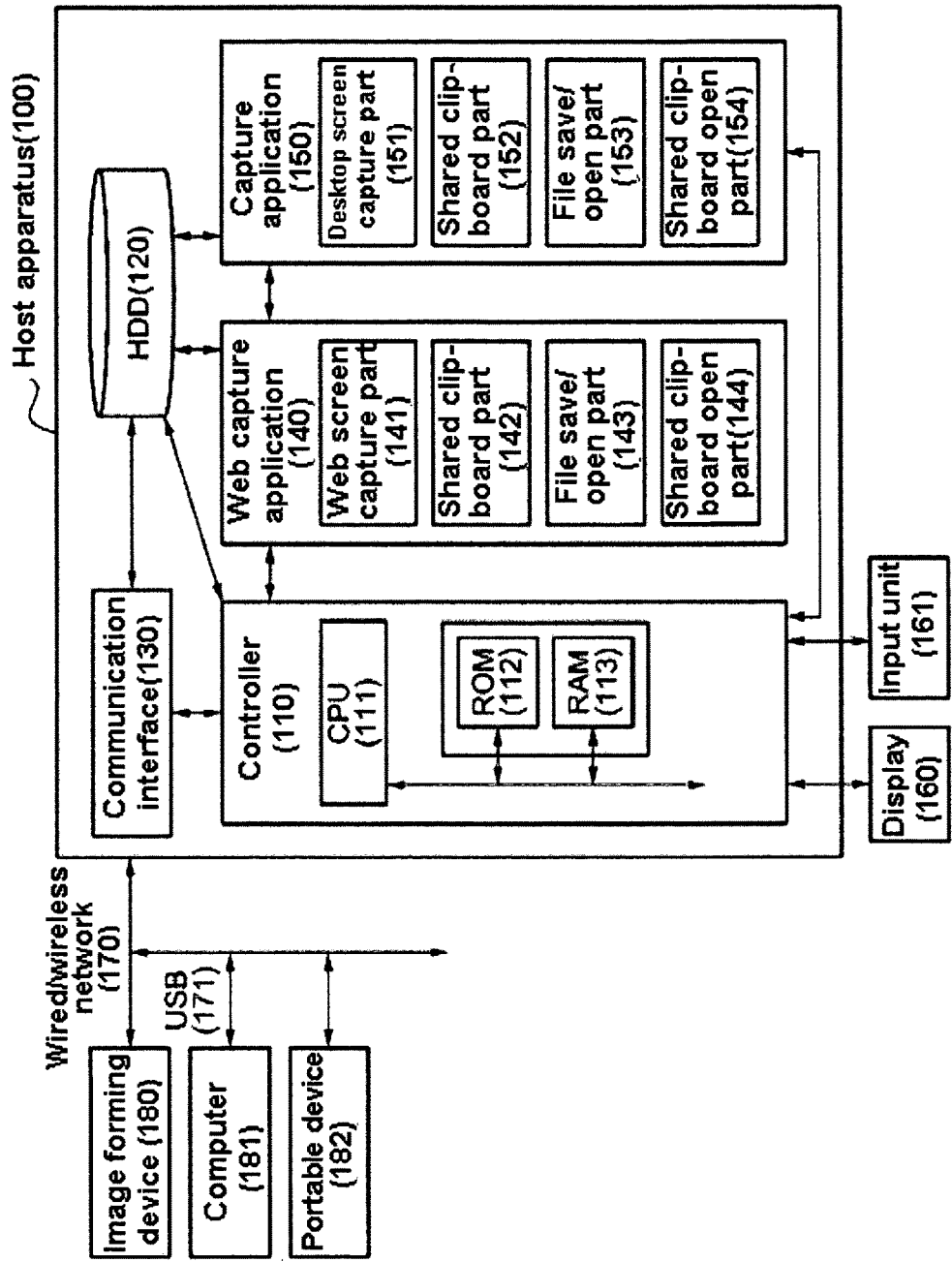
FIG. 1 is a block diagram illustrating a host apparatus according to an exemplary embodiment of the present disclosure.

Reference will now be made in detail to the embodiments of the present disclosure, examples of which are illustrated in the accompanying drawings, wherein like reference numerals refer to like elements throughout.

FIG. 1 is a block diagram illustrating a host apparatus according to an exemplary embodiment of the present disclosure.

Referring to FIG. 1, a host apparatus 100 according to an exemplary embodiment of the present disclosure may be connected to a wired/wireless network 170. The host apparatus 100 may perform USB communication using a USB interface 171.

The host apparatus 100 may be connected to at least one image forming device, at least one computer 181 or at least one portable device 182, through the wired/wireless network 170 or the USB interface 171.

The portable device 182 refers to a device capable of being carried by a user, including a cellular phone, a smart phone, a digital camera, an e-book reader, a tablet PC, or a portable storage medium (e.g., a USB memory or a memory card) and it is not limited to the above-mentioned devices.

Hereinbelow, an external device may be used to refer to the image forming device 180, the computer 181, or the portable device 182.

The host apparatus 100 may include a controller 110, a Hard Disk Drive (HDD) 120, a communication interface 130, a web capture application 140, and a capture application 150. A display 160 and an input unit 161 may be connected to the host apparatus 100.

The controller 110 may include a Central Processing Unit (CPU) 111, a Read Only Memory (ROM) 112 in which control programs are stored, and a Random Access Memory (RAM) 113 which is used to store input data or used as a task related memory region. The CPU 111, the ROM 112, and the RAM 113 may be connected to one another through an internal bus.

The controller 110 may control the HDD 120, the communication interface 130, the web capture application 140, the capture application 150, the display 160, and the input unit 161.

The display 160 is connected to the host apparatus 100 and displays shortcut icons corresponding to various applications supported by the host apparatus 100. Corresponding applications may be driven using the displayed shortcut icons.

The display 160 may be implemented using at least one of a CRT monitor (not shown) and a TFT LCD monitor (not shown) which display the above-described icons, and a touch screen which displays the above-described icons and through which a user performs an input function.

The display 160 may be configured in an all-in-one form which is not separated from the host apparatus 100.

User input for manipulation of the host apparatus 100 is performed through the input unit 161 connected to the host apparatus 100. Examples of the input unit 161 may include a variety of hardware or software modules as well as a keyboard (not shown), a mouse (not shown), and a touch screen (not shown).

The HDD 120 may store at least one of a first file (not shown) captured using the web capture application 140 and a second file (not shown) captured using the capture application 150 according to control of the controller 110.

The first file or the second file may be stored in the HDD 120 according to control of the controller 110 corresponding to a storage command input in the web capture application 140 or a storage command input in the capture application 150.

The web capture application 140 or capture application 150 which is capable of being installed in the host apparatus 100 may be installed in the HDD 120.

Files having various extensions supported by the web capture application 140 or the capture application 150 may be stored in the HDD 120 and in an Object Linking and Embedding (OLE) entity.

A first capture area (321, refer to FIG. 4) added to a page area (333, refer to FIG. 3) of a first shared clipboard (330, refer to FIG. 3) or the page area 333 including the first capture area 321 may be stored as an independent first file (not shown).

A second capture area (521, refer to FIG. 6) added to a page area (533, refer to FIG. 5) of a second shared clipboard (530, refer to FIG. 5) or the page area 533 including the second capture area 521 may be stored as an independent second file (not shown).

Hereinbelow, a storage may be used to refer to the ROM 112 or RAM 113 within the controller 110 or to refer to the HDD 120.

The communication interface 130 may be connected to at least one image forming device 180, at least one computer 181, or at least one portable device 182, through the wired/wireless network 170 or the USB interface 171.

The host apparatus 100 may perform tasks corresponding to a first file (not shown) or a second file (not shown) stored in a storage using an external device through the communication interface 130.

The web capture application 140 includes a web screen capture part 141, a first shared clipboard part 142, a file save/open part 143, and a first shared clipboard open part 144.

The web capture part 141 may capture the first capture area 321 selected by a user through the input unit 161 from a web browser screen 320 (e.g. a web page) displayed on the display 160.

The captured first capture area 321 may be all of the screen 320 using a scroll capture or part of the screen 320 using selective capture.

The first shared clipboard part 142 may add the first capture area 321 captured through the web capture part 141. The captured first capture area 321 is added to a page area 333 of the screen area 332 of the first shared clipboard 330.

The first shared clipboard 330 includes a menu area 331 including at least one menu icon which is configured to edit the screen area 332 including at least one page area 333 and to edit the first capture area 321 added to the page area 333.

The page area 333 of the first shared clipboard 330 is displayed in correspondence to the size of a recording medium, (e.g. A4, A3, letter, legal, etc.), supported by the image forming device 180 connected to the host apparatus 100.

If a power switch of the host apparatus 100 is turned on to boot up the host apparatus 100, if the web capture application 140 is driven, or after the host apparatus 100 is booted up, the host apparatus 100 may request the image forming device 180 to provide device information including the size of a supported recording medium using the communication interface 130 at a predetermined period (e.g. 10 minutes) and may set the page area 333 of the first shared clipboard 330 using the device information received from the image forming device 180.

Alternatively, a user may set the size of a recording medium corresponding to the page area 333 through a page area setting of the menu area 331 of the web capture application 140, or the size of a recording medium, (e.g. A4 only), which is preset by a manager, may be set and displayed as the page area 333 of the first shared clipboard 330 using a solution program (not shown) of a server (not shown) which manages the web capture application 140 installed in at least one host apparatus 100.

The page area 332 displayed on the screen area 332 of the first shared clipboard 330 may be added or deleted according to user input.

The file save/open part 143 may save the first capture area 321 added to the page area 333 in a storage or an external device as a first file (not shown).

The first file may have a file extension of PDF, TIFF, or W2P. The first capture area 321 may be stored in at least one of a storage and an external device as a text file or a document (DOC) file having an extension of TXT or RTF, respectively.

At least one of an image file and a text file which are stored in a storage or an external device is opened in the first shared clipboard 330.

A W2P file among savable files is compatible in both the web capture application 140 and the capture application 150.

In addition to the W2P file, files having extensions which are compatible in both the web capture application 140 and the capture application 150 may be used as the first file.

If the first file is saved as a W2P file, it is possible to open, edit, and save the previously saved W2P file in the first shared clipboard 330 of the web capture application 140 or in the second shared clipboard 530 of the capture application 150.

Hereinbelow, 'open' and 'import' may be used as having the same meaning.

The first shared clipboard open part 144 may import the second capture area (521, refer to FIG. 6) added to the second shared clipboard (530, refer to FIG. 5) of the capture application 150 (before the second capture area is saved as a W2P file) from the first shared clipboard 330.

If both the web capture application 140 and the capture application 150 are driven, the second capture area 521 added to the page area 533 of the second shared clipboard 530 of the capture application 150 may be temporarily stored in a storage. The first shared clipboard 330 of the web capture application 140 may import and display the temporarily stored second capture area 521.

The capture application 150 includes a desktop screen capture part 151, a second shared clipboard part 152, a file save/open part 153, and a second shared clipboard open part 154.

The desktop screen capture part 151 may capture the second capture area 521 selected by a user through the input unit 161 from a desktop screen (520, refer to FIG. 5) displayed on the display 160.

The captured second capture area 521 may be all of the desktop screen 520, or part of the desktop screen 520 using selective capture.

The second shared clipboard part 152 may add the second capture area 521 captured through the desktop screen capture part 151. The captured second capture area 521 may be added to a page area 533 of a screen area 532 of the second shared clipboard 530.

The second shared clipboard 530 includes a menu area 531 including at least one menu icon which is configured to edit the screen area 532 including at least one page area 533 and to edit the second capture area 521 added to the page area 533.

The page area 533 of the second shared clipboard 530 is displayed in correspondence to the size of a recording medium, (e.g. A4, A3, letter, etc.), supported by the image forming device 180 connected to the host apparatus 100.

If a power switch of the host apparatus 100 is turned on to boot up the host apparatus 100, if the capture application 150 is driven, or after the host apparatus 100 is booted up, the host apparatus 100 may request the image forming device 180 to provide device information including the size of a supported recording medium using the communication interface 130 at a predetermined period (e.g. 10 minutes) and may set the page area 533 of the second shared clipboard 530 using the device information received from the image forming device 180.

Alternatively, a user may set the size of a recording medium corresponding to the page area 533 through page area setting of the menu area 531 of the capture application 150, or the size of a recording medium, (e.g. A4 only), which is preset by a manager, may be set and displayed as the page area 533 of the second shared clipboard 530 using a solution program (not shown) of a server (not shown) which manages the capture application 150 installed in at least one host apparatus 100.

The page area 533 displayed on the screen area 532 of the second shared clipboard 530 may be added or deleted according to user input.

The file save/open part 153 may store the second capture area 521 added to the page area 533 in a storage or an external device as a second file (not shown).

Files which are savable as the second file (not shown) may have a file extension of PDF, TIFF, or W2P. Alternatively, the second file may be stored in a storage or an external device as a text file or a DOC file having an extension of TXT or RTF.

At least one of an image file and a text file which are stored in a storage or an external device may be opened in the second shared clipboard 530.

A W2P file among savable files is compatible in both the capture application 150 and the web capture application 140. In addition to the W2P file, files having extensions which are compatible in both the capture application 150 and the web capture application 140 may be used as the second file.

If the second file (not shown) is stored as a W2P file, it is possible to open, edit, and save the W2P file in the second shared clipboard 530 of the web capture application 150 or in the first shared clipboard 330 of the web capture application 140.

The second shared clipboard open part 154 may open the first capture area 321 added to the first shared clipboard 330 of the web capture application 140 (before the first capture area is stored as a W2P file) from the second shared clipboard 530.

If both the web capture application 140 and the capture application 150 are driven, the first capture area 321 added to the page area 333 of the first shared clipboard 330 of the web capture application 140 may be temporarily stored in a storage. The second shared clipboard 530 of the capture application 150 may open and display the temporarily stored first capture area 321, Referring to FIG. 1, although the web capture application 140 includes the first shared clipboard 330 and the capture application 150 includes the second shared clipboard 530, the web capture application 140 and the capture application 150 may be integrated into one shared clipboard (not shown).

In this case, the web capture application 140 includes the web screen capture part 141, the file save/open part 142, and the shared clipboard open part 144, and the capture application 150 includes the desktop screen capture part 151, the file save/open part 152, and the shared clipboard open part 154. The shared clipboard open parts 144 and 154 may be included in the shared clipboard (not shown) to open the temporarily stored capture areas 321 and 521, respectively.

The web capture application 140 and the capture application 150 may share a shared clipboard (not shown). The web screen capture part 141 of the web capture application 140 captures the first capture area 321 from the screen 320 of the web browser 310 and the captured first capture area 321 may be added to the shared clipboard (not shown).

The file save/open part 143 may save the first capture area 321 added to the shared clipboard (not shown) in a storage or an external device as a first file (not shown) and may open at least one of a previously stored image file and text file.

The shared clipboard open part 144 may open the second capture area 521 which is captured from the desktop screen 520 of the capture application 150 and is temporarily stored.

Similarly to the web capture application 140, the desktop screen capture part 151 of the capture application 150 captures the second capture area 521 from the desktop screen 520 and the captured second capture area 521 may be added to a screen capture board (not shown).

The file save/open part 153 may save the second capture area 521 added to the shared clipboard (not shown) in a storage or an external device as a second file (not shown) and may open at least one of a previously stored image file and text file.

The shared clipboard open part 154 may open the second capture area 521 which is captured from the screen 320 of the web browser 310 of the web capture application 140 and is temporarily stored.

The image forming device 180 is connected to the host apparatus 100 through the wired/wireless interface 170 or the USB interface 171.

The image forming device 180 may receive a request for device information including the size of a recording medium supported by the image forming device 180, which corresponds to the page area 333 of the first shared clipboard 330 or the page area 533 of the second shared clipboard 530 of the host apparatus 100, and may transmit the device information to the host apparatus 100.

The device information refers to information set in a printer and includes at least one of, for example, a model name, a device name, a device ID, an IP address, a recording medium size, and an output count information.

The device information including a recording medium size is stored in a storage of the image forming device 180. An HDD (not shown), or a ROM (not shown) or a RAM (not shown) within a controller (not shown) may be used as the storage.

The image forming device 180 may print data received from the computer 181 or the host apparatus 100 in at least one of color and monochrome forms.

If the image forming device 180 is an MFP, it may include a scanner (not shown) and a fax machine (not shown).

The fax machine (not shown) may transmit image data scanned by the scanner (not shown) to another fax machine (not shown) using a telephone line (not shown), transmit the image data to an external device by attaching it on an email, or transmit the image data to the external device in a saved file form.

The host apparatus 100 may be a portable device such as a cellular phone, a smart phone, a tablet PC, or a handheld PC. The communication interface 130 of the host apparatus 100 may wirelessly transmit corresponding file data to other cellular phones or smart phones.

Figure 2:
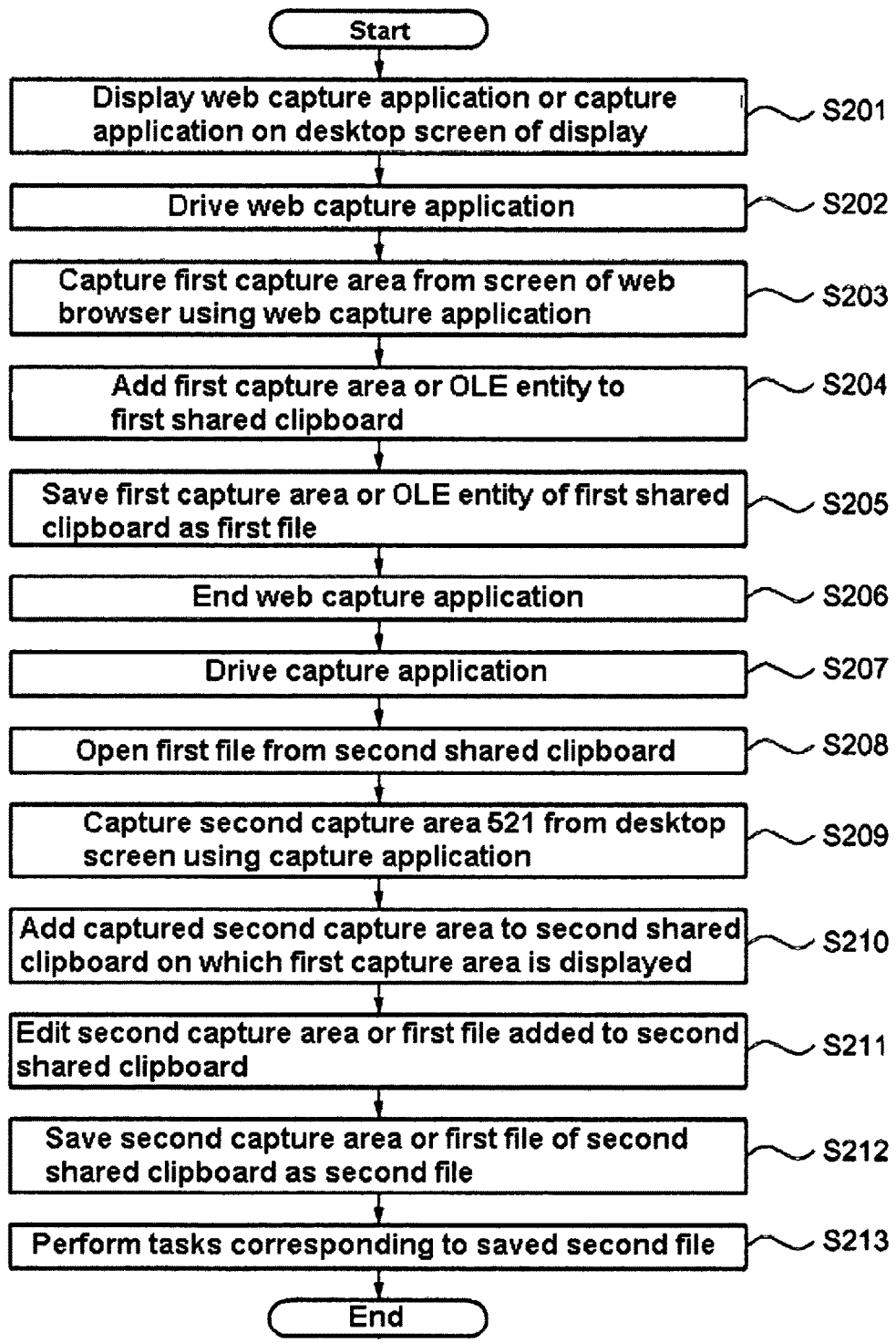
FIG. 2 is a flowchart explaining a screen capture control method of a host apparatus according to an exemplary embodiment of the present disclosure.

FIG. 2 is a flowchart explaining a screen capture control method of a host apparatus according to an exemplary embodiment of the present disclosure.

Referring to FIG. 2, the web capture application 140 and the capture application 150 are displayed on the display 160 of the host apparatus 100 in operation S201.

The displayed web capture application 140 and capture application 150 may be displayed as separate shortcut icons and the displayed web capture application 140 and the capture application 150 may be driven using the displayed separate shortcut icons.

Since the web capture application 140 may be plugged into the web browser 310, the web capture application 140 may be driven by selecting a shortcut icon 312 corresponding thereto from a toolbar 311 of the web browser 310, after the web browser 310 is driven.

The capture application 150 may be driven by a preset shortcut key (e.g. PrintScreen key) of a keyboard (not shown) included in the input unit 161.

Alternatively, the web capture application 140 or the capture application 150 may be driven by selecting a shortcut icon (not shown) displayed on correspondingly on a system tray provided by operating system of the host apparatus 100.

In operation S202, the web capture application 140 displayed on the display 160 is driven using the input unit 161. An initial user interface screen of the web capture application 140 is described with reference to FIG. 3.

Figure 3:
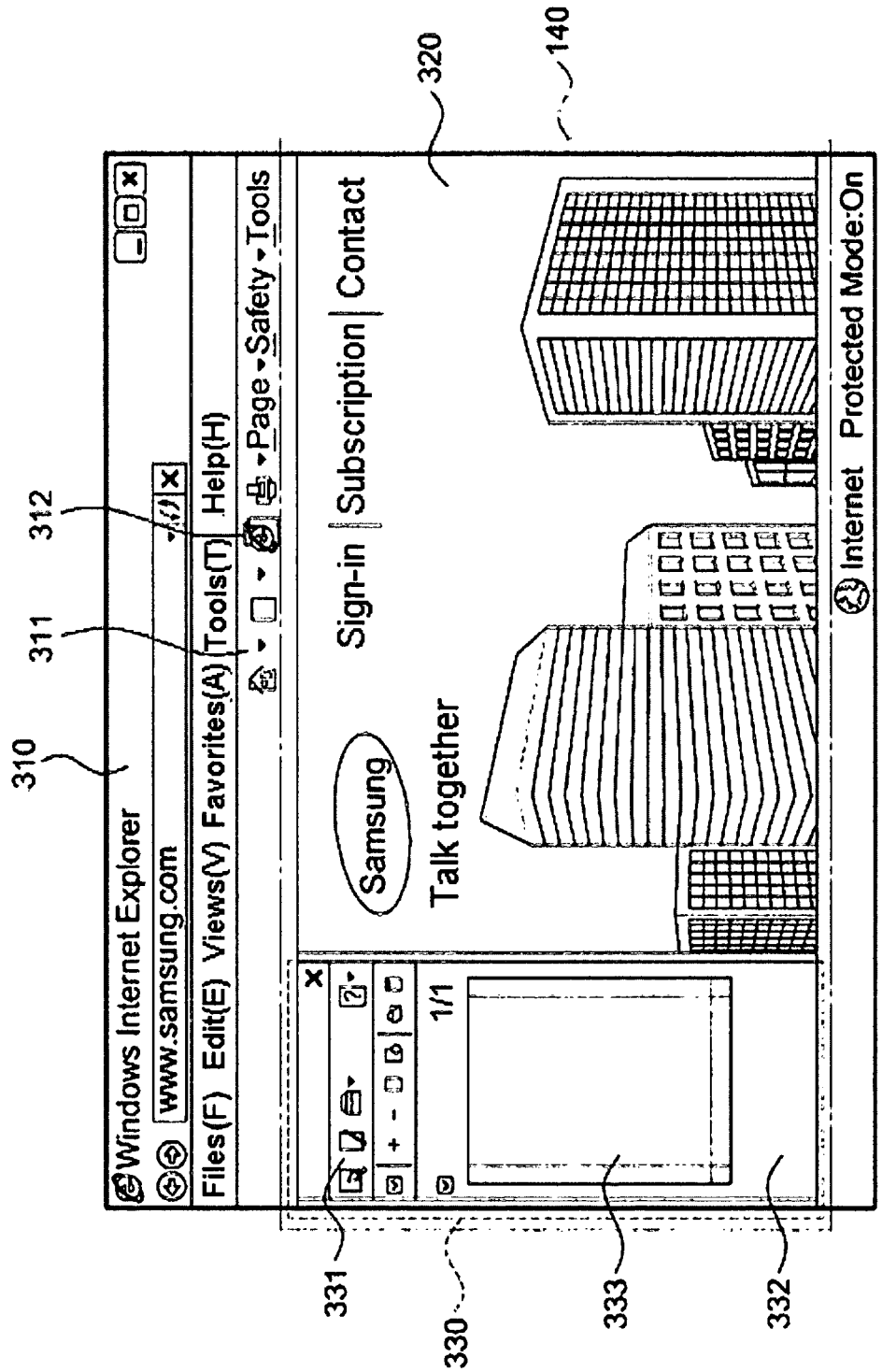
FIG. 3 is a diagram illustrating an example of an initial user interface screen of a web capture application according to an exemplary embodiment of the present disclosure.

FIG. 3 is a diagram illustrating an example of an initial user interface screen of a web capture application according to an exemplary embodiment of the present disclosure.

The driven web capture application 140 includes the screen 320 on which a web page is displayed and a capture area is input by the input unit 161 and includes the first shared clipboard 330.

When the web capture application 140 is driven, the web capture application 140 may temporarily store a whole area which can be captured within the displayed screen 320.

The first shared clipboard 330 is displayed at one side of the screen 320 of the web capture application 140. The location of the first shared clipboard 330 on the screen 320, (e.g. an upper, lower, left, or right side of the screen 320) is changeable according to user input.

The screen 320 of the web capture application 140 may be shifted in correspondence to the location or size of the first shared clipboard 330 (then the screen 320 may be scrolled in an upward, downward, left or right direction) or the size of the screen 320 may be reduced correspondingly.

The first shared clipboard 330 includes the screen area 332 including at least one page area 333 and includes a menu area 331 including at least one menu icon to edit the first capture area 321 added to the page area 333.

The page area 333 of the screen area 332 is displayed on correspondence to the size of a recording medium supported by the image forming device 180 connected to the host apparatus 100.

The first shared clipboard 330 may be hidden, and in this case, the size of the screen 320 may be changeably displayed.

The menu area 331 may include fast execution tools corresponding to 'add page area', 'delete page area', 'page area setting', 'editing tool', 'open', 'save', 'print', 'fax transmission', and 'open shared clipboard'.

The first capture area 321 added to the first shared clipboard 330 may be edited or saved using the fast execution tools. It is possible to preview the page area 333 including the first capture area 321.

Tasks corresponding to the edited or saved first file (not shown) may be implemented using an external device.

The implemented tasks may include at least one of print, fax transmission, and file transmission.

In operation S203 of FIG. 2, the first capture area 321 is captured from the screen 320 of the web browser 310 using the web capture application 140.

A web capture operation of the web capture application 140 is described in detail with reference to FIG. 4.

Figure 4:
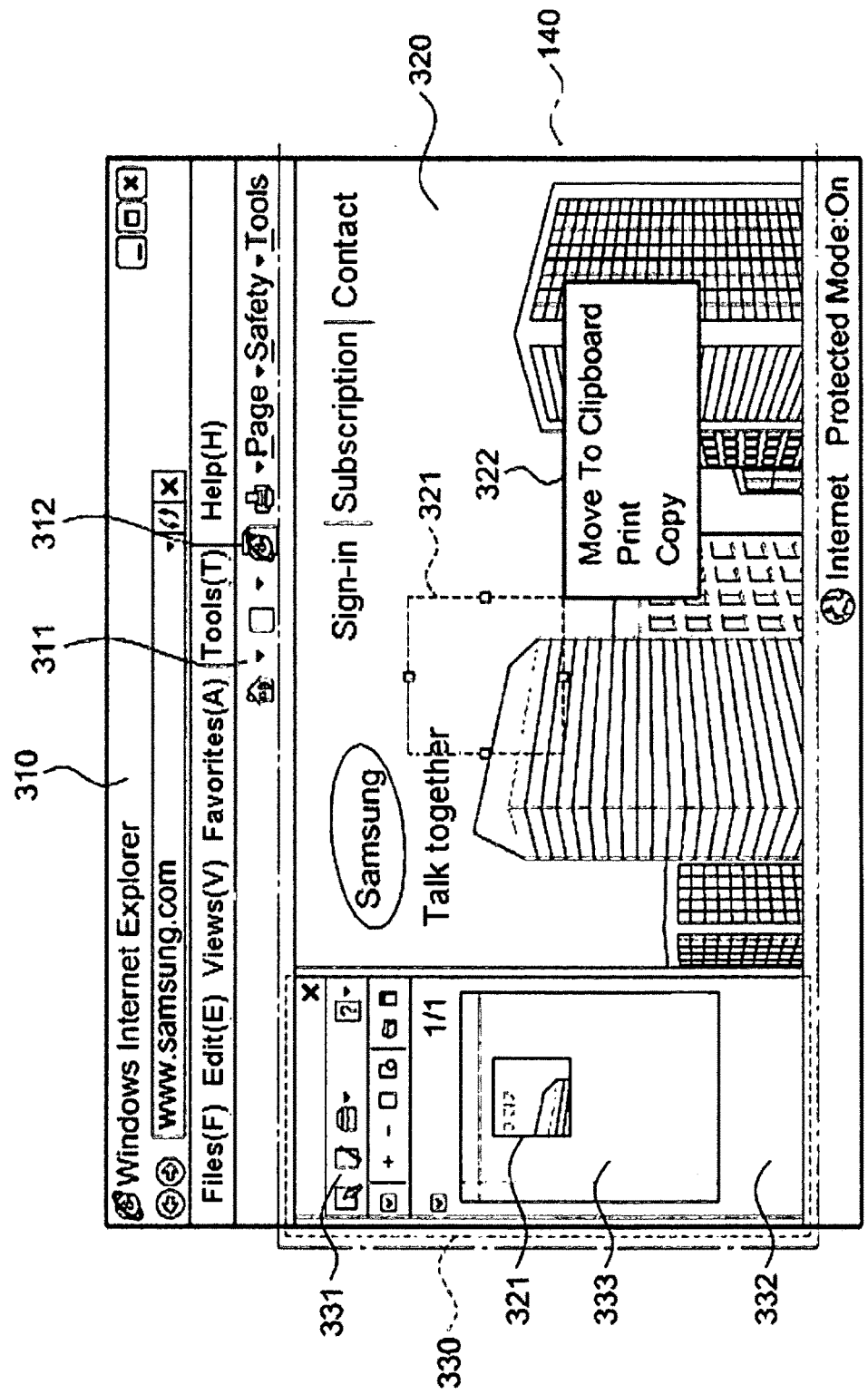
FIG. 4 is a diagram illustrating an example of a user interface screen to capture a first capture area of a web browser screen through a web capture application and add the first capture area to a first shared clipboard according to an exemplary embodiment of the present disclosure.

FIG. 4 is a diagram illustrating an example of a user interface screen to capture a first capture area of a web browser screen through a web capture application and add the first capture area to a shared clipboard according to an exemplary embodiment of the present disclosure.

Referring to FIG. 4, the first capture area 321 is captured using the input unit 161 from the screen 320 of the web browser 310 according to user input.

The first capture area 321 may include a looped curve as well as a polygonal shape.

If the first capture area 321 is captured using the input unit 161, text included in coordinates may be extracted by determining coordinates corresponding to the first capture area 321 from the whole area of the temporarily saved screen 320 and parsing an HTML document corresponding to the whole area of the screen 320 when the web capture application 140 is driven.

The extracted text may be saved as a file. An image corresponding to the first capture area 321 may be extracted using the coordinates.

A text object and extracted image corresponding to the extracted text may be saved as an Enhanced MetaFile (EMF) file which is in a vector graphics format.

The captured first capture area 321 may be displayed separately from the screen 320.

Referring to FIG. 2, the captured first capture area 321 (i.e. EMF file) is added to the first shared clipboard 330 in operation S204.

Referring to FIG. 4, the first capture area 321 may be added to the page area 333 of the first shared clipboard through selecting, drag and drop operations from the screen 320 using the input unit 161.

A context menu 322 corresponding to the first capture area 321 is displayed on the screen 320 using the input unit 161. If a user selects 'Move to Clipboard' from the context menu 322, the first capture area 321 may be moved and added to the first shared clipboard 330.

The size of the moved first capture area 321 may be correspondingly changed to the size of the page area 333 of the first shared clipboard 140.

A user may predict an actual size of the first capture area 321 by referring to the size of a recording medium supported by the image forming device 180.

A user may add another capture area (i.e. EMF file) to the first shared clipboard 330 from the screen 320.

Referring to FIG. 2, an OLE entity may be added to the first shared clipboard 330 in operation S204.

One method of adding the OLE entity to the first shared clipboard 330 is described with reference to FIG. 8.

Figure 8:
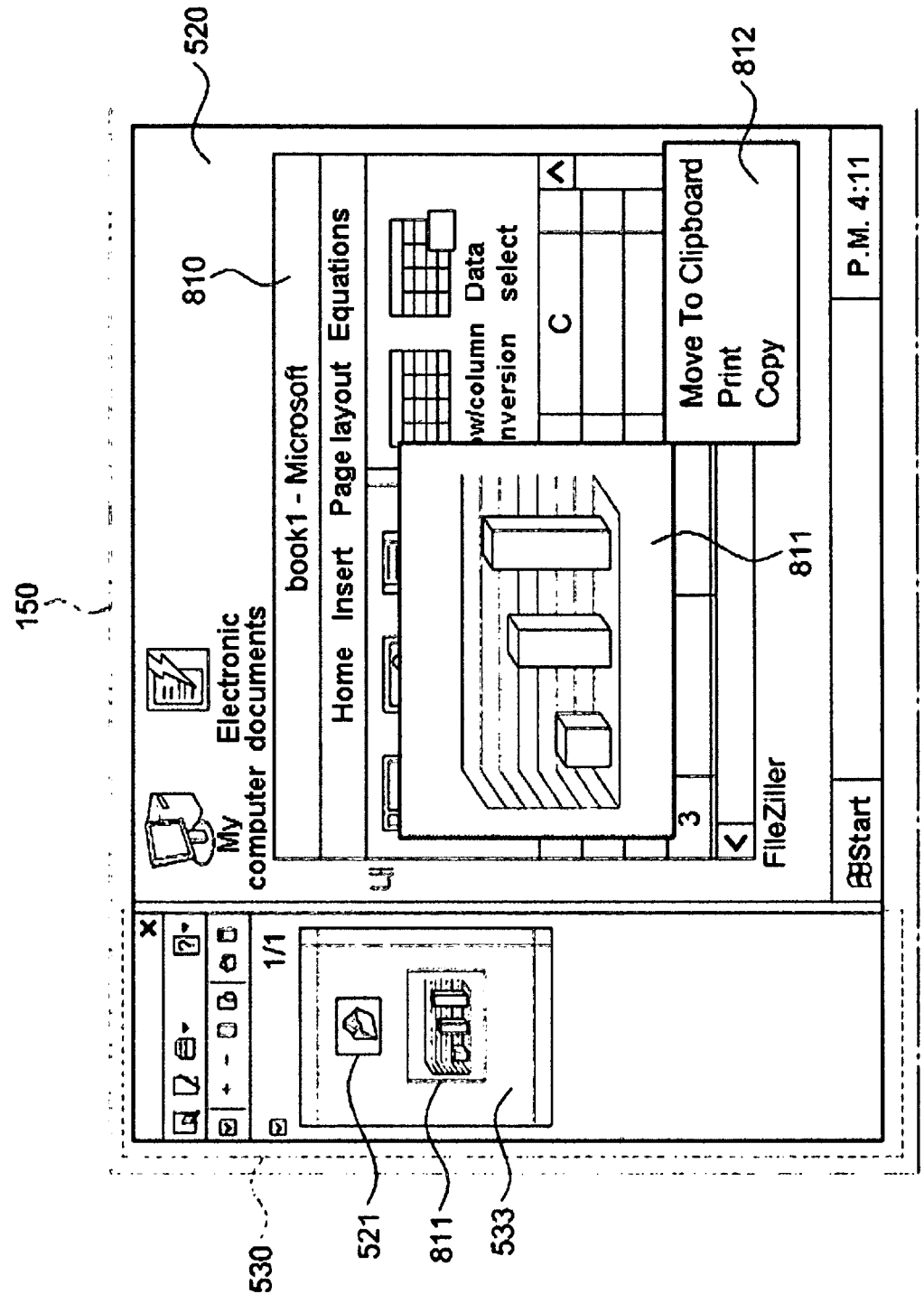
FIG. 8 is a diagram illustrating an example of a user interface screen to add an OLE entity to a second shared clipboard according to an exemplary embodiment of the present disclosure.

FIG. 8 is a diagram illustrating an example of a user interface screen to add an OLE entity to a shared clipboard according to an exemplary embodiment of the present disclosure.

Referring to FIG. 8, if an OLE entity (e.g. graph 811) generated from a spreadsheet application 810 (e.g. Microsoft, Office, or Excel) is selected using the input unit 161 and if a context menu 812 corresponding to the graph 811 is displayed using the input unit 161, a user may select 'Move to Clipboard' from the context menu 812 to move the OLE entity to the second shared clipboard 530.

FIG. 8 illustrates an example of adding the graph 811 to the second shared clipboard 530 using the capture application 150. It is possible to perform an addition function to the first shared clipboard 330 using the web capture application 140.

As another method of adding the OLE entity to the second shared clipboard 530, the graph 811 generated from the spreadsheet application 810 may be selected and 'copy' may be selected from the context menu 812 corresponding to the graph 811.

If the capture application 150 is executed and 'paste' is selected from a context menu (not shown) in the page area 533 of the second shared clipboard 530 to which the second capture area 521 is added from the desktop screen 520, the graph 811 is added to the second shared clipboard 530 and thus the second capture area 521 and the graph 811 may be displayed together.

Referring to FIG. 2, both the first capture area 321 and the graph 811 may be displayed in the first shared clipboard 330 in operation S204.

At least one of the first capture area 321 and the graph 812 may vary in location or size using the input unit 161 and the menu area 331.

In operation S205 of FIG. 2, the page area 333 including the first capture area 321 added to the first shared clipboard 330 is stored in a storage or an external device as a first file (not shown).

The first file (not shown) may have an extension of PDF, TIFF, or W2P.

A W2P file may include a plurality of items among at least one image which is a vector graphics format, at least one image layout coordinate, order, a selectively added text object, and address information (e.g. URL) of the screen 320.

The plurality of items may be saved as markup language including eXtended Markup Language (XML).

A capture area or file having URL information may display a corresponding web page through the web browser 310 when it is double-clicked or 'open web page' is selected from a context menu.

If the first file is saved as a W2P file, it is possible to open, edit, or save the W2P file in the first shared clipboard 330 of the web capture application 140 or in the second shared clipboard 530 of the capture application 150.

If the first file is a PDF file, it may be saved as a searchable PDF file including an extracted text object corresponding to the first capture area 321.

The first file may be saved as a text file or a DOC file having an extension of TXT or RTF using the extracted text object.

The first file may be saved only using the first capture area 321.

If a plurality of capture areas is added to the first shared clipboard 330, the capture areas may be saved as files corresponding thereto. If there is a plurality of page areas 333, the plurality of page areas 333 may be saved as a first file.

In operation S206 of FIG. 2, the web capture application is ended.

The web browser 310 may be driven and only the web capture application 140 may be ended.

In operation S207 of FIG. 2, the capture application 150 is driven on the display 160.

The capture application 150 may be driven by selecting a shortcut icon corresponding thereto, selecting a shortcut icon displayed on a system tray provided by operating system of the host apparatus 100, or inputting a preset shortcut key in a keyboard (not shown).

Figure 5:
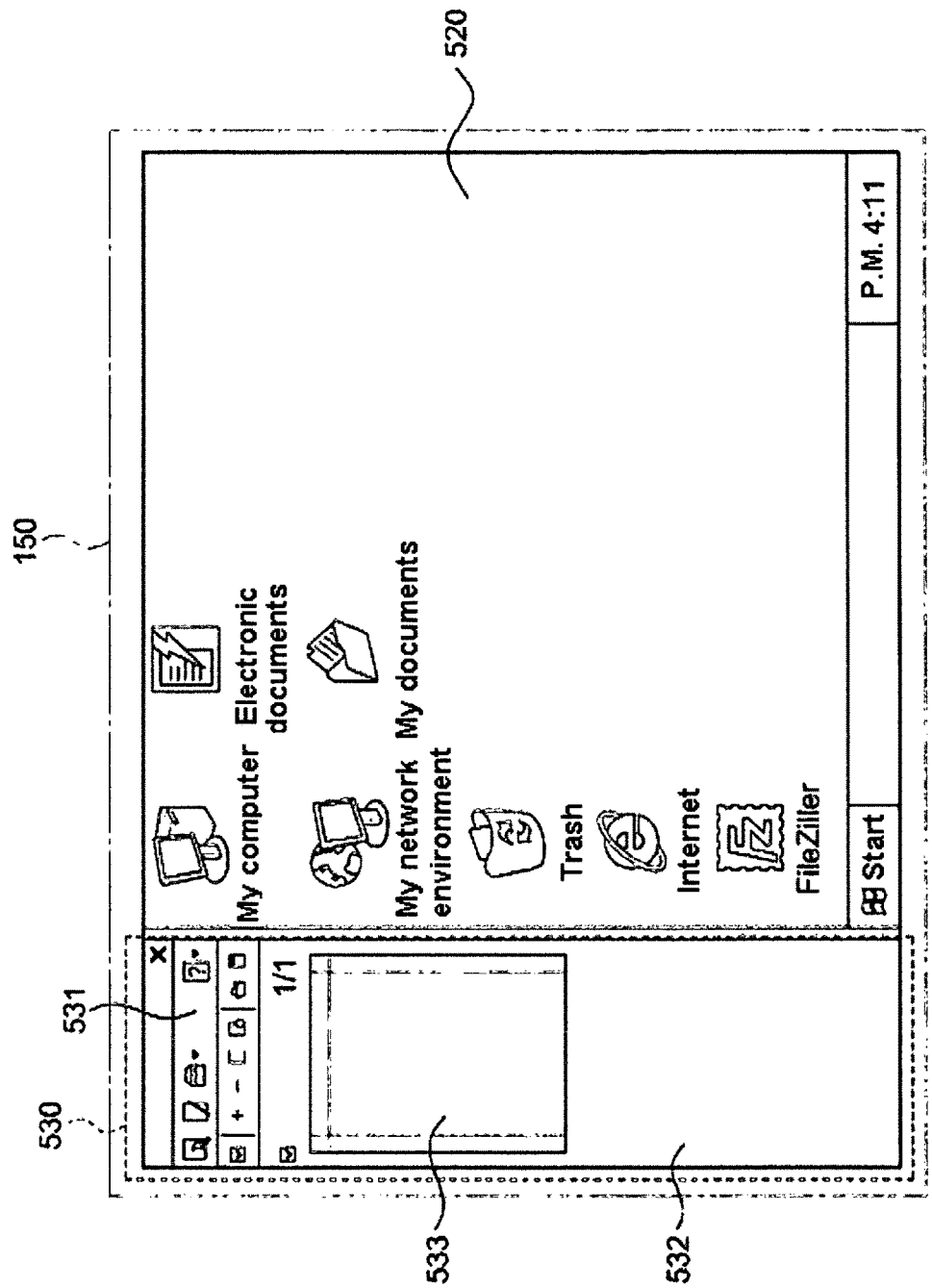
FIG. 5 is a diagram illustrating an example of an initial user interface screen of a capture application according to an exemplary embodiment of the present disclosure.

FIG. 5 is a diagram illustrating an example of an initial user interface screen of a capture application according to an exemplary embodiment of the present disclosure.

The capture application 150 is displayed on the display 160 and includes a desktop screen 520 in which a captured area is input by the input unit 161 and the second shared clipboard 530.

If the capture application 150 is driven, the capture application 150 may temporarily save a whole area which can be captured within the displayed desktop screen 520.

The second shared clipboard 530 is displayed at one side of the desktop screen 520 of the capture application 150. The location of the second shared clipboard 530 on the desktop screen 520, (e.g. an upper, lower, left, or right side of the desktop screen 520), is changeable according to user input.

The desktop screen 520 of the capture application 150 may be shifted in correspondence to the location or size of the second shared clipboard 530 (then the desktop screen 520 may be scrolled in an upward, downward, left or right direction) or the size of the desktop screen 520 may be reduced correspondingly.

The second shared clipboard 530 includes a screen area 532 including at least one page area 533 and includes a menu area 531 including at least one menu icon to edit the second capture area 521 added to the page area 533.

The page area 533 of the screen area 532 is displayed on correspondence to the size of a recording medium supported by the image forming device 180 connected to the host apparatus 100.

The second shared clipboard 530 may be hidden, and in this case, the size of the desktop screen 520 may be changeably displayed.

The menu area 531 may include fast execution tools corresponding to 'add page area', 'delete page area', 'page area setting', 'editing tool', 'open', 'save', 'print', 'fax transmission', and 'open shared clipboard'.

The second capture area 521 added to the second shared clipboard 530 may be edited or saved using the fast execution tools. It is possible to preview the page area 533 including the second capture area 521.

Tasks corresponding to the edited or saved second file (not shown) may be implemented using an external device.

The implemented tasks may include at least one of print, fax transmission, and file transmission.

In operation S208 of FIG. 2, a first file (not shown) is opened from the second shared clipboard 530. Opening the capture application 150 is described in detail with reference to FIG. 7.

Figure 7:
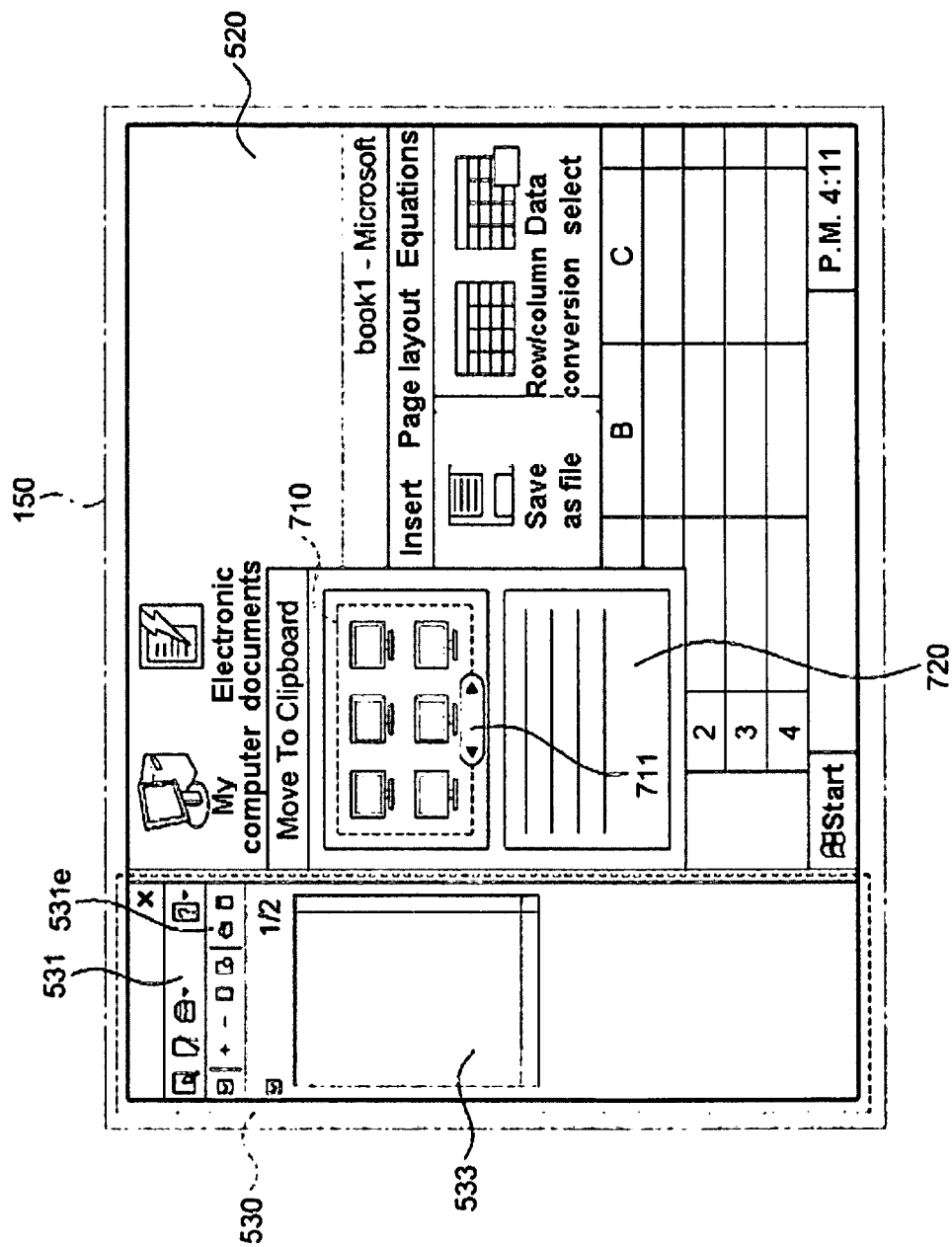
FIG. 7 is a diagram illustrating an example of a user interface screen to import a previously saved file in a second shared clipboard of a capture application according to an exemplary embodiment of the present disclosure.

FIG. 7 is a diagram illustrating an example of a user interface screen to open a previously saved file in a capture application according to an exemplary embodiment of the present disclosure.

Referring to FIG. 7, if a user selects an 'open' tool using a context menu (not shown) in the second shared clipboard 530 displayed at one side of the capture application 150 or selects an 'open' tool 531e of the menu area 531, a file list (not shown) or thumbnail images 710 and 720 including at least one of a previously saved first file, image file, or text file are displayed.

If a displayed thumbnail image 710 includes a plurality of pages, a page shift key 711 may be displayed to shift the plurality of pages.

The file list (not shown) or the thumbnail images 710 and 720 may be displayed at one side of the second shared clipboard 530 and may overlap on the desktop screen 520.

If a user selects a file name from the displayed file list (not shown) or selects at least one thumbnail image from the thumbnail images 710 and 720, a file or thumbnail image is added to the second shared clipboard 530.

If an opened file is a W2P file, it is added to the second shared clipboard 530 while maintaining a saved format (e.g. at least one image, at least one image layout coordinate, order, text object, and URL information).

The selected file name or thumbnail image 710 may be distinguishably displayed from unselected files or the thumbnail image 720.

In operation S209 of FIG. 2, the second capture area 521 of the desktop screen 520 is captured using the capture application 150. A capture operation of the capture application 150 is described in detail with reference to FIG. 6.

Figure 6:
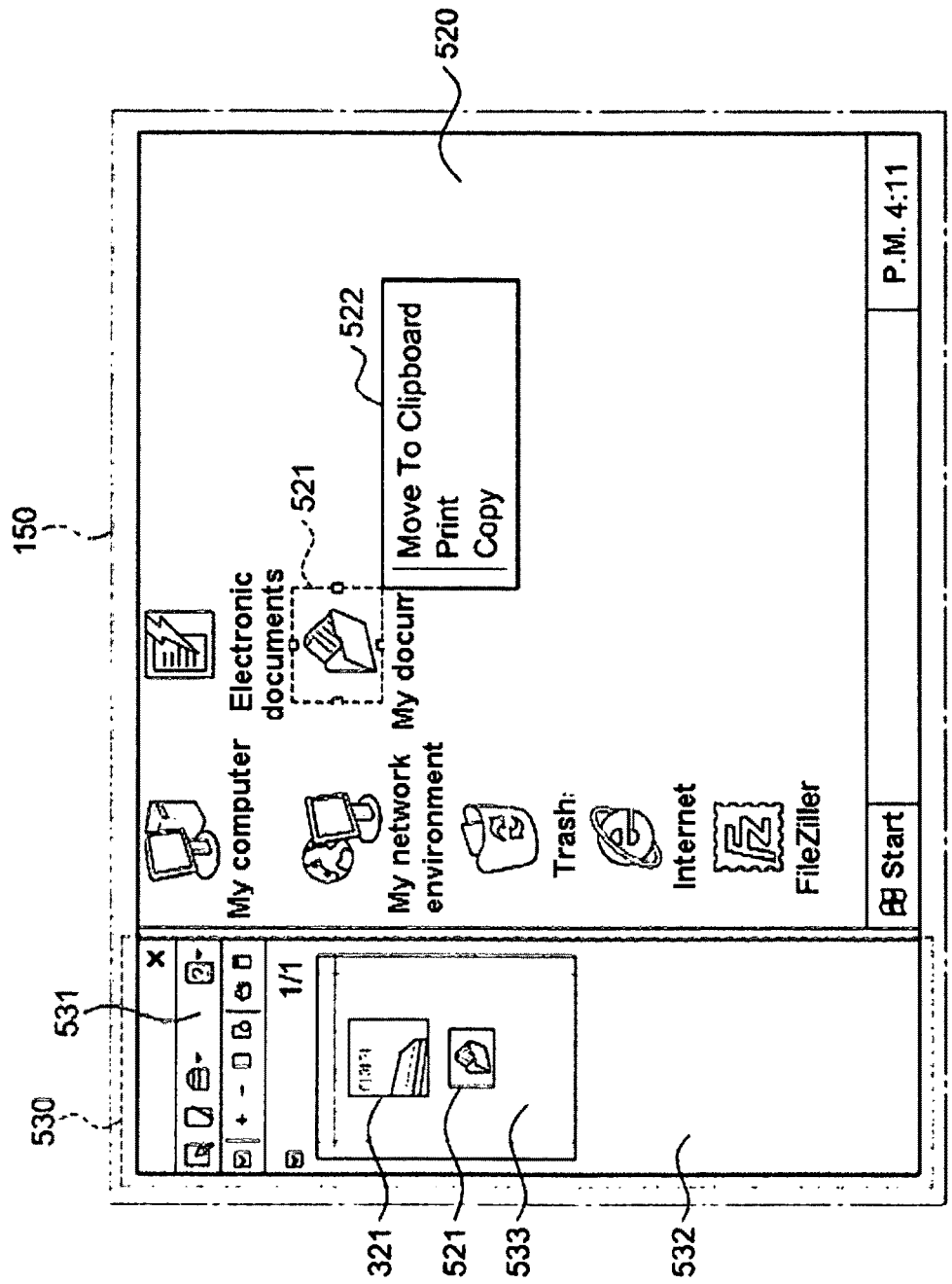
FIG. 6 is a diagram illustrating an example of a user interface screen to capture a second capture area of a desktop screen through a capture application and add the second capture area to a second shared clipboard according to an exemplary embodiment of the present disclosure.

FIG. 6 is a diagram illustrating an example of a user interface screen to capture a second capture area of a desktop screen through a capture application and add the second capture area to a shared clipboard according to an exemplary embodiment of the present disclosure.

Referring to FIG. 6, the second capture area 521 is captured using the input unit 161 from the desktop screen 520 by according to user input.

The second capture area 521 may include a looped curve as well as a polygonal shape.

If the second capture area 521 is captured using the input unit 161, an image corresponding to coordinates of the second capture area 521 is extracted from the whole area of the temporarily saved desktop screen 520 when the web capture application 140 is driven and is saved as a bitmap file.

The captured first capture area 521 may be distinguishably displayed from the desktop screen 520.

In operation S210 of FIG. 2, the captured second capture area 521 (i.e. a bitmap file) is added to the second shared clipboard 530 on which the first capture area is displayed.

Referring to FIG. 6, the second capture area 521 may be added to the page area 533 of the second shared clipboard 530 through selecting, drag and drop operations from the desktop screen 520 using the input unit 161.

A context menu 522 corresponding to the second capture area 521 is displayed on the desktop screen 520 using the input unit 161 and 'Move to Clipboard' may be selected from the context menu 522 to move and add the second capture area 521 to the second shared clipboard 530.

The size of the moved second capture area 521 may be correspondingly changed to the size of the page area 533 of the second shared clipboard 530.

A user may predict an actual size of the second capture area 521 by referring to the size of a recording medium supported by the image forming device 180.

A user may add another capture area (i.e. bitmap file) to the second shared clipboard 530 from the desktop screen 520.

In operation S210 of FIG. 2, an OLE entity may be added to the second shared clipboard 530.

A method of adding the OLE entity to the second shared clipboard 530 of the capture application 150 may be similar to operation S204 of FIG. 2. According to one aspect, all or part of the above-described operation S204 of FIG. 2 may be performed.

In operation S210 of FIG. 2, the first capture area 321 corresponding to the opened first file, the second capture area 521, and the graph 821 corresponding to the OLE entity may be displayed together on the second shared clipboard 530.

At least of the first capture area 321, the second capture are 521, or the graph 812 may vary in location and size displayed in the page area 333 of the second shared clipboard 530 using the input unit 161 and the menu area 531.

In operation S211 of FIG. 2, at least one of the first capture area 321, the added second capture area 521, and the graph 811 which are displayed on the second shared clipboard 530 may be edited or may be saved as a second file (not shown) without an editing operation.

In operation S212 of FIG. 2, the first capture area 321, the second capture area 521, or the graph 821 of the second shared clipboard 330 is saved as a second file (not shown) in a storage or an external device.

The second file (not shown) may have an extension of PDF, TIFF, or W2P.

A W2P file may include a plurality of items among at least one image which is a bitmap format, at least one image layout coordinate, order, or a selectively added text object. The plurality of items may be saved as markup language including XML.

Since the second capture area 521 captured from the capture application 150 has a bitmap format, it does not include text. However, if the second capture area 521 is saved as a W2P file, a text object may be allocated to be saved so that text may be added thereafter.

If the second file (not shown) is saved as a W2P file, it is possible to open, edit, or save the W2P file in the second shared clipboard 530 of the capture application 150 or in the first shared clipboard 330 of the web capture application 140.

If the second file is a PDF file, it may be saved as a PDF of an image rather than a searchable PDF file since there is no corresponding text object.

The second capture area 521 of a bitmap format may be saved as a text file using an Optical Character Recognition (OCR) function. Text included in the second capture area 521 may be saved as a text file or a DOC file having an extension of TXT or RTF by recognizing the text using the OCR function. If character recognition is performed, the second file may be added as a text object of a W2P file.

Only the second capture area 521 captured from the desktop screen 520 may be the second file.

If a plurality of capture areas is added to the second shared clipboard 530, the respective capture areas may be saved as corresponding files. If there is a plurality of page areas 533, the respective page areas 533 may be saved as the second file.

In operation S213 of FIG. 2, tasks corresponding to the saved second file are performed.

The corresponding tasks may include at least one of printing the second file (not shown) through the image forming device 180, performing fax-transmission to another fax machine using a fax part (not shown) of the image forming device 180, and transmitting the second file (not shown) to the computer 181 or the portable device 182 through the communication interface 130.

If task execution is ended, a procedure is ended.

Figure 9:
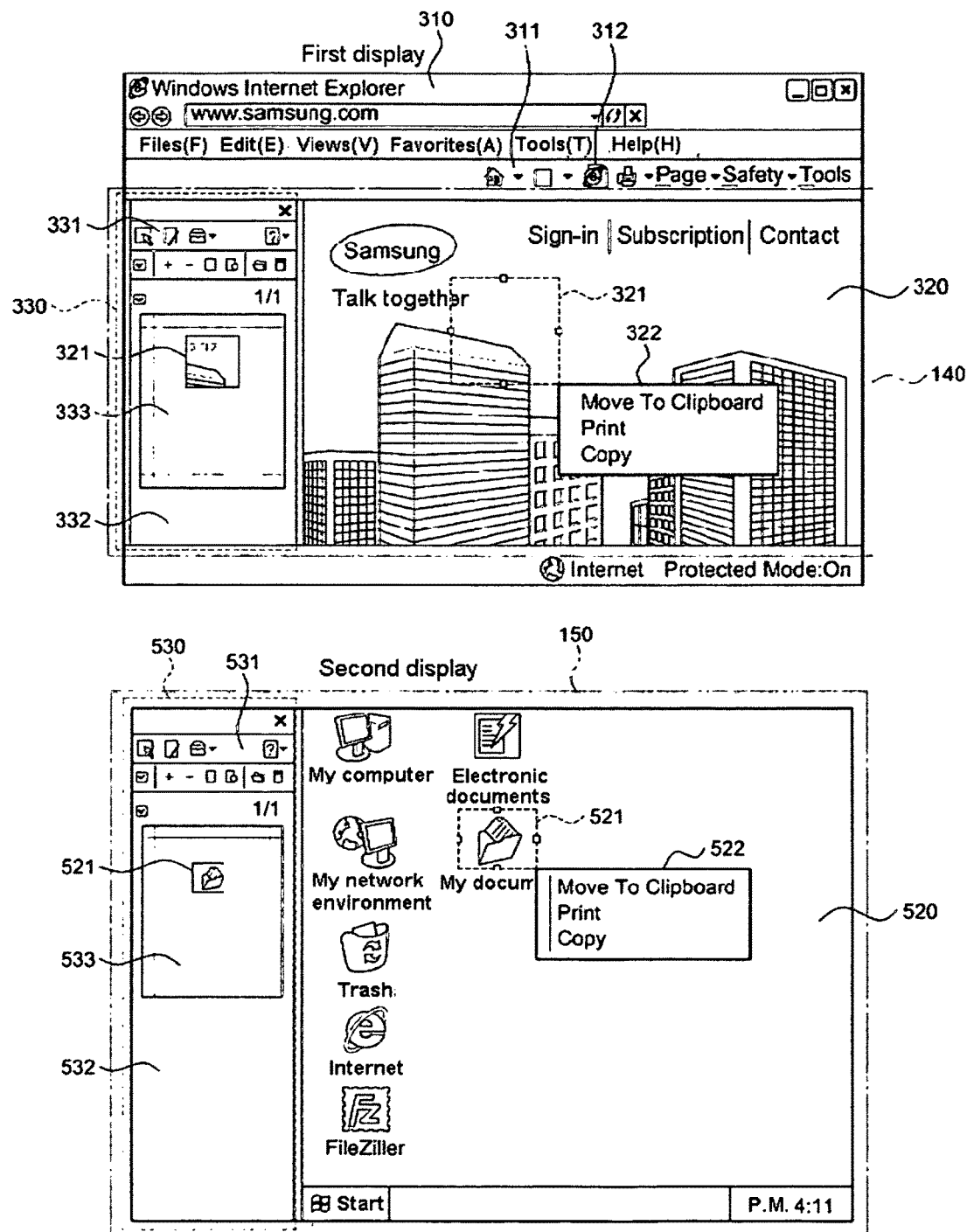
FIG. 9 is a diagram illustrating an example of an initial user interface screen of each of a web capture application and a capture application displayed on a plurality of displays according to an exemplary embodiment of the present disclosure.

FIG. 9 is a diagram illustrating an example of an initial user interface screen of each of a web capture application and a capture application displayed on a plurality of displays according to an exemplary embodiment of the present disclosure.

Referring to FIG. 9, the web capture application 140 may be driven on a first display 900 and the capture application may be driven on a second display 950.

A web capturing operation of the web capture application 140 driven on the first display 900 is similar to that described with reference to FIGS. 3 and 4.

The first capture area 321 may be captured using the input unit 161 from the screen 320 of the web browser 310 displayed on the first display 900.

The captured first capture area 321 may be moved to the first shared clipboard 330 by selecting 'Move to Shared Clipboard' of the context menu 322 or using drag and drop using the input unit 161.

The first capture area 321 displayed on the first shared clipboard 330 may be edited using an editing menu of the menu area 331 and may be saved as a compatible file (e.g. W2P file), or a PDF, TIFF or text file.

Alternatively, the first capture area 321 may be temporarily saved internally without being saved as a file.

An operation of the capture application 150 driven on the second display 950 is similar to that described with reference to FIGS. 5 and 6.

The second capture area 521 may by captured using the input unit 161 from the desktop screen 520 displayed on the second display 950.

The captured second capture area 521 may be moved to the second shared clipboard 530 by selecting 'Move to Shared Clipboard' of the context menu 522 or using drag and drop using the input unit 161.

The second capture area 521 displayed on the second shared clipboard 530 may be edited using a menu of the menu area 531 and may be saved as a compatible W2P file), a PDF or TIFF file, or as a text file using character recognition.

As in the first shared clipboard 330, the second capture area 521 in the second shared clipboard 530 may be temporarily saved internally without being saved as a file.

It is possible to paste the temporarily stored first and second capture areas 321 and 521 to the first and second shared clipboards 330 and 530 using 'Open Shared Clipboard' in the menu areas 331 and 531 in the first and second clipboards 330 and 530 which are being driven on the first and second displays 900 and 950, respectively.

Figure 10:
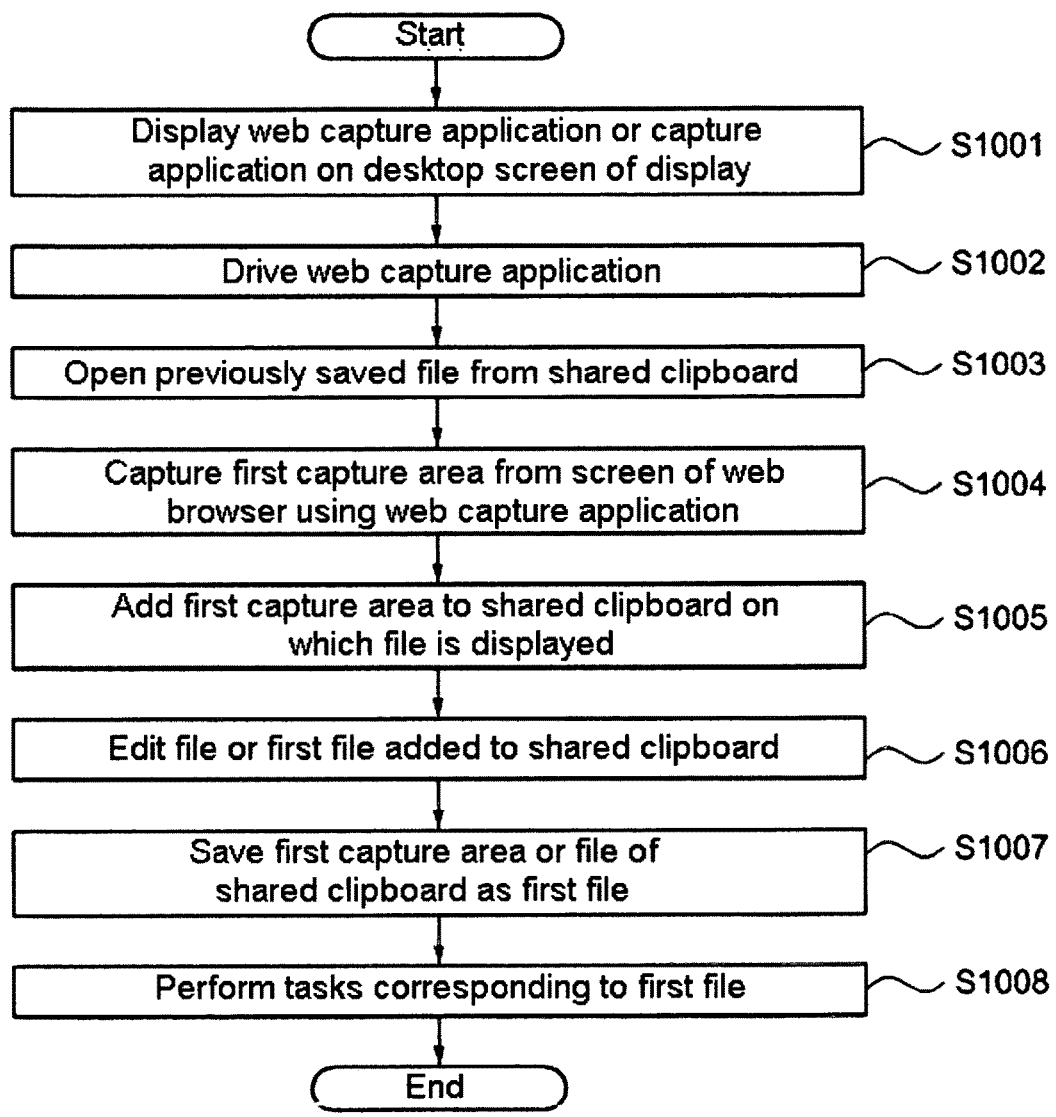
FIG. 10 is a flowchart explaining a screen capture control method of a host apparatus according to another exemplary embodiment of the present disclosure.

FIG. 10 is a flowchart explaining a screen capture control method of a host apparatus according to another exemplary embodiment of the present disclosure.

Referring to FIG. 10, at least one of the web capture application 140 and the capture application 150 is displayed on the display 160 of the host apparatus 100 in operation S1001.

The web capture application 140 and the capture application 150 may be displayed as separate shortcut icons. The web capture application 140 or the capture application 150 may be driven using each shortcut icon.

In operation S1002, the web capture application 140 is driven using a shortcut icon by the use of the input unit 161.

The shortcut icon (not shown) includes a shortcut icon (not shown) of a system tray provided by operating system of the host apparatus 100.

Since the web capture application 140 may be plugged into the web browser 310, the web capture application 140 may be driven by driving the web browser 310 and then selecting the shortcut icon 312 corresponding thereto from the toolbar 311 of the web browser 310.

The driven web capture application 140 includes the screen 320 of the web browser 310 and the first shared clipboard 330.

If the web capture application 140 is driven, it may temporarily store all areas which can be captured within the displayed screen 320.

In operation S1003, a file saved in a storage of the host apparatus 100 or an external device is opened from the first shared clipboard 330.

if a user selects an 'open' tool using a context menu (not shown) from the first shared clipboard 330 displayed at one side of the web capture application 140 or selects an open tool 531 of the menu area 531, a file list (not shown) or at least one thumbnail 710 or 720 corresponding to at least one previously saved file including a compatible W2P file is displayed.

If the thumbnail 710 includes a plurality of pages, the page shift key 711 may be displayed to shift between the plurality of pages.

The file list (not shown) or the thumbnails 710 and 720 may be displayed at one side of the first shared clipboard 330 and may overlap on the screen 320.

If a user selects a file name from the displayed file list (not shown) or selects at least one thumbnail from the thumbnails 710 and 720, the selected file or thumbnail is added to the first shared clipboard 330.

If an opened file is a W2P file, it is added to the first shared clipboard 330 while maintaining a saved format (e.g. at least one image, at least one image layout coordinate, order, text object, and URL information).

In operation S1004, the first capture area 321 is captured from the screen 320 of the web browser 310 using the web capture application 140. The first capture area 321 may be distinguishably displayed from the screen 320 and may include a looped curve as well as a polygonal shape.

If the first capture area 321 is captured using the input unit 161, text included in coordinates may be extracted by determining coordinates corresponding to the first capture area 321 from the whole area of the temporarily saved screen 320 and parsing an HTML document corresponding to the whole area of the screen 320.

An image corresponding to the first capture area 321 may be extracted using the determined coordinates.

A text object and extracted image corresponding to the extracted text may be saved as an EMF file which is a vector graphics format.

In operation S1005, the first capture area 321 is added to the first shared clipboard 330 on which the opened file is displayed.

The first capture area 321 may be added to the page area 333 of the first shared clipboard 330 through drag and drop operations using the input unit 161 or selecting 'Move to Shared Clipboard' from the context menu 322 corresponding to first capture area 321.

The size of the moved first capture area 321 may be changed corresponding to the size of the page area 333 of the first shared clipboard 330.

A user may predict an actual size of the first capture area 321 by referring to the size of a recording medium supported by the image forming device 180.

A user may add another capture area to the first shared clipboard 330 from the screen 320.

In operation S1006, a file or the first capture area 321, displayed on the first shared clipboard 330, is edited.

At least one of the file and the first capture area 321 may vary in location or size displayed on the page area 333 of the shared clipboard 330 using the input unit 161 and the menu area 331.

In operation S1007, the displayed file and first capture area 321 are saved as a first file (not shown).

The first file (not shown) may have an extension of PDF, TIFF, or W2P. If the displayed file is a W2P file, the first capture area 321 may be overwritten into a plurality of items (at least one image, image coordinates, order, and text object) by maintaining the plurality of items when saved or may be saved as a new W2P file.

If a plurality of capture areas is added to the first shared clipboard 330, the respective capture areas may be saved as corresponding files. If there is a plurality of page areas 333, files including the plurality of page areas 333 may be saved as a first file.

In operation S1008, tasks corresponding to the saved first file are performed.

The corresponding tasks may include transmitting the first file to the image forming device 180 through the communication interface 130 and printing the first file, performing fax transmission of the first file to another fax machine using a fax part (not shown) of the image forming device 180, or transmitting the first file to the computer 181 or the portable device 182.

Figure 11:
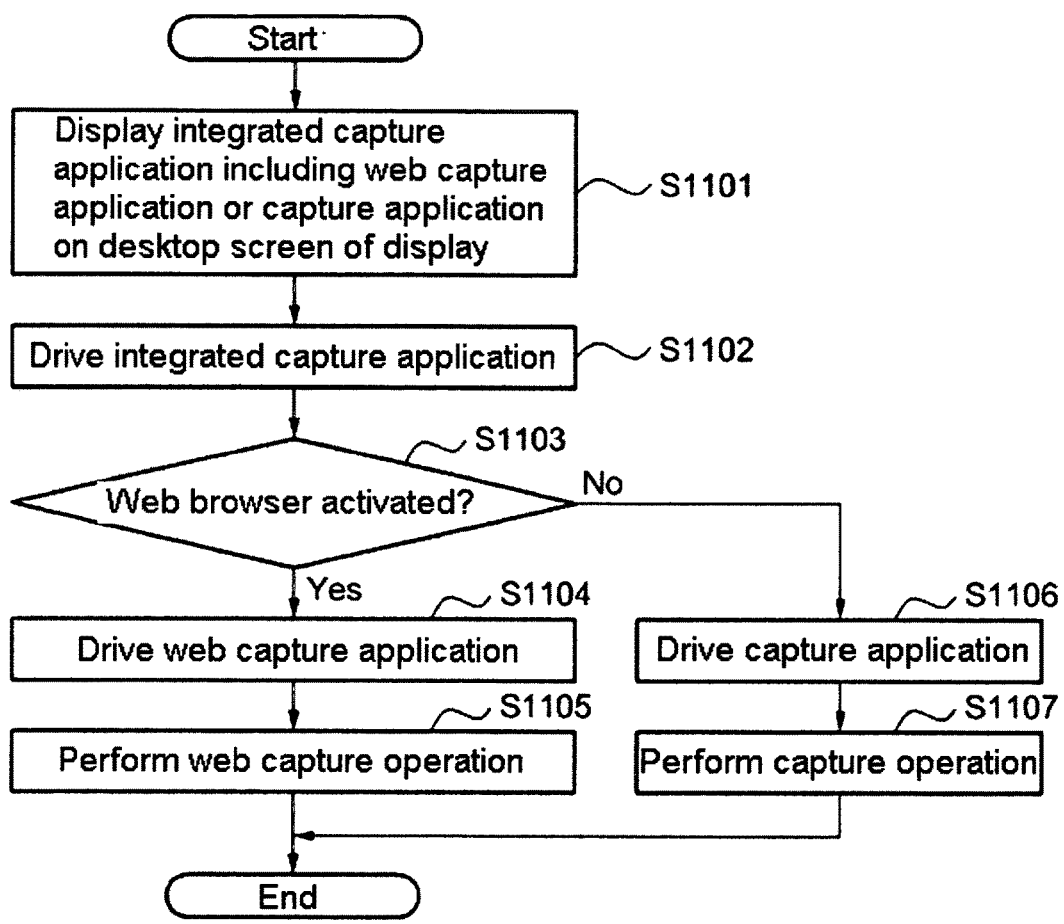
FIG. 11 is a flowchart explaining a screen capture control method of a host apparatus according to still another exemplary embodiment of the present disclosure.

FIG. 11 is a flowchart explaining a screen capture control method of a host apparatus according to still another exemplary embodiment of the present disclosure.

Referring to FIG. 11, an integrated capture application (not shown) including both the web capture application 140 and the capture application 150 is displayed on the display 160 of the host apparatus in operation S1101.

The integrated capture application may be displayed as at least one of a shortcut icon of the display 160 and a shortcut icon displayed on a system tray provided by operating system of the host apparatus 100.

In operation S1102, the integrated capture application is driven using the input unit 161.

The integrated capture application may be driven by selecting one of the shortcut icons of the display 160 or the shortcut icon of the system tray of the operating system of the host apparatus.

In operation S1103, the integrated capture application (not shown) determines whether the web browser 310 is activated using activation information of the web browser 310.

The activation information is obtained using at least one of a registry (not shown) of operating system and a task manager (not shown) of operating system.

In operation S1104, if it is determined using the activation information that the web browser 310 is activated, the web capture application 140 is driven.

In operation S1105, a web capture operation is performed using the driven web capture application 140. The web capture operation may be performed in a similar way to the operation described in operations S203 to S205.

In FIG. 2, all or part of the above-described operations S203 to S205 may be performed.

After the web capture operation of the web capture application 140 is performed, the procedure is ended.

Meanwhile, if it is determined that the web browser is not activated, the capture application 150 is driven in operation S1106.

In operation S1107, a capture operation is performed using the driven capture application 150. The capture operation may be performed similarly to the operation described in operations S208 to S213.

In FIG. 2, all or part of the above-described operations S208 to S213 may be performed.

After the capture operation of the capture application 150 is performed, the procedure is ended.

The methods according to the exemplary embodiments of the present disclosure may be implemented in a program command form which can be performed through a variety of computer means and may be recorded in a non-transitory computer readable medium. The computer readable medium may include a program command, a data file, and a data structure independently or by combination. The program command recorded in the medium may be designed and configured specially for the present disclosure or may be known to a person skilled in computer software art.

As is apparent from the above description, a host apparatus and a screen capture control method thereof are provided in which a first file captured using a web capture application or a second file captured using a capture application can be compatibly saved.

A host apparatus and a screen capture control method thereof are provided in which a first file captured using a web capture application or a second file captured using a capture application can be opened through both the web capture application and the capture application.

A host apparatus and a screen capture control method thereof are provided in which a web capture application or a capture application is selectively driven depending on whether a web browser displayed in a display is activated.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A screen capture control method of a host apparatus, the screen capture control method comprising:
   transmitting a request to an image forming device at a power-on of the host apparatus and at predetermined time intervals thereafter, requesting device information of the image forming device, the device information including a size of a recording medium supported by the image forming device;
   receiving, from the image forming device, the device information;
   displaying, on a display, a shared clipboard of a first capture application to capture a web browser and a second capture application to capture a desktop, the shared clipboard including at least one page area having a size which is proportional to the size of the recording medium supported by the image forming device connected to the host apparatus, based on the received device information;
   receiving first captured data via the first capture application and receiving second captured data via the second capture application;
   displaying the first and second captured data on a same page area among the at least one page area included in the shared clipboard that is displayed on the display; and
   outputting the first and second captured data to the image forming device connected to the host apparatus.

2. The screen capture control method of claim 1, wherein the first capture application is an application operating with the web browser by using a plug-in.

3. The screen capture control method of claim 1, further comprising:
   receiving an entity of another application executed on the host device, and storing the received entity through the shared clipboard.

4. The screen capture control method of claim 1, wherein when the display includes a plurality of displays, a first shared clipboard of the first capture application is displayed on one of the plurality of displays, and a second shared clipboard of the second capture application is displayed on another one of the plurality of displays.

5. The screen capture control method of claim 1, further comprising:
   outputting the first and second captured data of the shared clipboard to the image forming device in response to a print command.

6. The screen capture control method of claim 1, wherein displaying the first and second captured data on the same page area comprises:
   displaying the first captured data in a first section of the same page area, and
   displaying the second captured data in a second section of the same page area.

7. The screen capture control method of claim 6, wherein a size of the first section and the second section are each independently adjustable, such that a user can predict a size of the first section and a size of the second section to be formed on a same recording medium by the image forming device when the first and second captured data are output to the image forming device by the host apparatus.

8. The screen capture control method of claim 1, wherein the first captured data corresponds to an image captured from a screen of the web browser, and
   the second captured data corresponds to an image captured from a screen of the desktop.

9. The screen capture control method of claim 1, wherein the second capture application captures an image from a desktop screen of the desktop, the desktop screen comprising a graphical user interface for an operating system in which selectable icons of objects to execute applications and/or to access folders are displayed in a desktop area of the desktop screen, and in which a toolbar and/or taskbar are displayed in another area of the desktop screen, separate from the desktop area.

10. The screen capture control method of claim 1, further comprising:
    receiving an input selecting an open tool of the shared clipboard;
    displaying, on the display, thumbnail images corresponding to saved files, in response to the selection of the open tool; and
    displaying a thumbnail image selected from the thumbnail images on the same page area including the first and second captured data among the at least one page area included in the shared clipboard that is displayed on the display.

11. The screen capture control method of claim 1, wherein receiving the second captured data via the second capture application comprises:
    capturing an image from the desktop in a first format;
    converting the image from the first format into a second format and saving the image in the second format as a file which can be opened, edited, and saved in the shared clipboard of the first application; and
    displaying the second captured data comprises displaying the file in the same page area among the at least one page area included in the shared clipboard.

12. The screen capture control method of claim 11, wherein the first format is a bitmap format and the image in the second format is editable such that text can be added to the image.

13. The screen capture control method of claim 11, wherein the converting comprises performing an optical character recognition function on the image in the first format to obtain the image in the second format and saving the image in the second format as a text file.

14. A non-transitory computer readable medium storing a program code of a capture application of a host apparatus, wherein performing the capture application comprises:
    transmitting a request to an image forming device at a power-on of the host apparatus and at predetermined time intervals thereafter, requesting device information of the image forming device, the device information including a size of a recording medium supported by the image forming device;
    receiving, from the image forming device, the device information;
    displaying, on a display, a shared clipboard of a first capture application to capture a web browser and a second capture application to capture a desktop, the shared clipboard including at least one page area having a size which is proportional to the size of the recording medium supported by the image forming device connected to the host apparatus, based on the received device information;

receiving first captured data via the first capture application and receiving second captured data via the second capture application;

displaying the first and second captured data on a same page area among the at least one page area included in the shared clipboard that is displayed on the display; and outputting the first and second captured data to the image forming device connected to the host apparatus.

15. The non-transitory computer readable medium of claim 14, wherein the first capture application is an application operating with the web browser by using a plug-in.

16. The non-transitory computer readable medium of claim 14, wherein the performing of the capture application further comprises:

receiving an entity of another application executed on the host apparatus, and storing the received entity through the shared clipboard.

17. The non-transitory computer readable medium of claim 14, wherein when the display includes a plurality of displays, a first shared clipboard of the first capture application is displayed on one of the plurality of displays, and a second shared clipboard of the second capture application is displayed on another one of the plurality of displays.

18. The non-transitory computer readable medium of claim 14, wherein the performing of the capture application further comprises:

outputting the first and second captured data of the shared clipboard to the image forming device in response to a print command.

19. A method of controlling an image forming device to which a host apparatus is connected, the method comprising:

receiving a request from the host device at a power-on of the host apparatus and at predetermined time intervals thereafter, requesting device information of the image forming device, the device information including a size of a recording medium that is printable by the image forming device;

providing, by the image forming device, the host apparatus with the device information about the image forming device including the size of the recording medium that is printable by the image forming device;

receiving captured data obtained by a first capture application and a second capture application for a same page area of a shared clipboard that is displayed on a display of the host apparatus, the same page area of the shared clipboard having a size which is proportional to the size of the recording medium printable by the image forming device; and forming an image of the captured data on the recording medium in response to the receiving of the captured data.

\* \* \* \* \*